US012200769B2

(12) United States Patent
Shi et al.

(10) Patent No.: US 12,200,769 B2
(45) Date of Patent: Jan. 14, 2025

(54) RANDOM ACCESS METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Cong Shi, Guangdong (CN); Xin You, Guangdong (CN); Qianxi Lu, Guangdong (CN); Weijie Xu, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 665 days.

(21) Appl. No.: 17/153,876

(22) Filed: Jan. 20, 2021

(65) Prior Publication Data

US 2021/0144771 A1    May 13, 2021

Related U.S. Application Data

(63) Continuation of application No. PCT/CN2019/081996, filed on Apr. 10, 2019.

(30) Foreign Application Priority Data

Aug. 1, 2018  (CN) .......................... 201810866886.6
Aug. 16, 2018 (CN) .......................... 201810936190.6

(51) Int. Cl.
   *H04W 74/0833*   (2024.01)
(52) U.S. Cl.
   CPC ............................ *H04W 74/0833* (2013.01)

(58) Field of Classification Search
   CPC . H04W 74/0833; H04W 76/11; H04W 76/27; H04W 74/008
   See application file for complete search history.

(56) References Cited

U.S. PATENT DOCUMENTS

2008/0194243 A1*  8/2008  Jeong ................ H04W 74/0866
                                                       455/418
2009/0259910 A1* 10/2009  Lee ....................... H04L 1/1864
                                                       714/748

(Continued)

FOREIGN PATENT DOCUMENTS

CN       102014516 A     4/2011
CN       106105366 A    11/2016

(Continued)

OTHER PUBLICATIONS

Nokia, Alcatel-Lucent Shanghai Bell "Considerations on NR RACH procedures", R2-168013; 3GPP TSG RAN WG2 Meeting #96; Reno, USA; Nov. 14-18, 2016. 5 pages.

(Continued)

*Primary Examiner* — Jael M Ulysse
(74) *Attorney, Agent, or Firm* — PERKINS COIE LLP

(57) ABSTRACT

Provided are a random access method and device and a computer storage medium. The method may include: receiving a random access response (RAR) message based on first identification information, the RAR message including second identification information; and monitoring a physical downlink control channel (PDCCH) in a preset time window based on the second identification information or third identification information associated with the second identification information, the PDCCH being scrambled through the second identification information or the third identification information.

12 Claims, 11 Drawing Sheets

(56) References Cited

U.S. PATENT DOCUMENTS

| | | | |
|---|---|---|---|
| 2013/0083739 A1* | 4/2013 | Yamada | H04W 74/006 370/329 |
| 2013/0301611 A1* | 11/2013 | Baghel | H04W 74/0833 370/329 |
| 2014/0010173 A1* | 1/2014 | Zakrzewski | H04W 74/0833 370/329 |
| 2014/0133430 A1* | 5/2014 | Yang | H04L 1/1854 370/329 |
| 2015/0319800 A1* | 11/2015 | Park | H04W 76/15 370/329 |
| 2015/0341918 A1* | 11/2015 | Yang | H04W 16/32 370/312 |
| 2016/0073431 A1* | 3/2016 | Park | H04W 16/32 370/329 |
| 2017/0019930 A1 | 1/2017 | Lee et al. | |
| 2017/0374644 A1* | 12/2017 | Ryu | H04W 76/27 |
| 2018/0007590 A1* | 1/2018 | Karout | H04W 76/10 |
| 2018/0077729 A1* | 3/2018 | Lee | H04W 72/23 |
| 2018/0103465 A1 | 4/2018 | Agiwal et al. | |
| 2018/0167980 A1 | 6/2018 | Shi et al. | |
| 2018/0184439 A1 | 6/2018 | Lee et al. | |
| 2018/0242367 A1* | 8/2018 | Kim | H04W 72/23 |
| 2018/0270869 A1* | 9/2018 | Tsai | H04W 74/006 |
| 2019/0037420 A1* | 1/2019 | Fujishiro | H04W 24/02 |
| 2019/0053272 A1* | 2/2019 | Tsai | H04W 76/27 |
| 2019/0075492 A1 | 3/2019 | Suzuki et al. | |
| 2019/0306867 A1* | 10/2019 | Cirik | H04W 72/0453 |
| 2019/0335515 A1* | 10/2019 | Chen | H04W 74/0858 |
| 2019/0380139 A1 | 12/2019 | Xiong et al. | |
| 2020/0120584 A1* | 4/2020 | Yi | H04L 5/0048 |
| 2020/0178318 A1* | 6/2020 | Yu | H04W 74/006 |
| 2020/0322031 A1* | 10/2020 | You | H04L 5/001 |
| 2020/0322992 A1* | 10/2020 | Isogawa | H04W 74/0891 |
| 2020/0374921 A1* | 11/2020 | Li | H04W 68/02 |
| 2021/0105813 A1* | 4/2021 | Lee | H04W 74/0833 |
| 2021/0105822 A1* | 4/2021 | Hakola | H04W 72/046 |
| 2021/0127370 A1* | 4/2021 | Ohara | H04L 5/0053 |
| 2021/0168858 A1* | 6/2021 | Liu | H04W 72/23 |
| 2021/0212115 A1* | 7/2021 | Dong | H04W 74/085 |
| 2021/0274538 A1* | 9/2021 | Liu | H04W 72/0453 |
| 2021/0289536 A1* | 9/2021 | Liu | H04W 74/0841 |

FOREIGN PATENT DOCUMENTS

| | | |
|---|---|---|
| CN | 106993335 A | 7/2017 |
| CN | 107852266 A | 3/2018 |
| CN | 108282899 A | 7/2018 |
| CN | 108282901 A | 7/2018 |
| CN | 108289337 A | 7/2018 |
| CN | 108353323 A | 7/2018 |
| CN | 109804697 A | 5/2019 |
| EP | 3407662 A1 | 11/2018 |
| KR | 10-2016-0132368 A | 11/2016 |
| KR | 10-2019-0052696 A | 5/2019 |
| RU | 2638181 C2 | 12/2017 |
| WO | 2015137632 A1 | 9/2015 |
| WO | 2017125049 A1 | 7/2017 |
| WO | 2017127126 A1 | 7/2017 |
| WO | 2018064367 A1 | 4/2018 |
| WO | 2018066934 A2 | 4/2018 |
| WO | 2018085428 A1 | 5/2018 |
| WO | 2018127240 A1 | 7/2018 |
| WO | 2018128523 A1 | 7/2018 |

OTHER PUBLICATIONS

CATT "Consideration on 2-step RA" R2-1700205; 3GPP TSG RAN WG2 Meeting Ad Hoc; Spokane, USA; Jan. 17-19, 2017. 6 pages.
SONY "Discussions on 2 Steps RACH Procedure" R1-1700471; 3GPP TSG RAN WG2 Meeting AH_NR Meeting; Spokane, USA; Jan. 17-19, 2017. 5 pages.
Notice of Reasons for Refusal for Japanese application No. 2021-505282, issued on Mar. 24, 2023. 12 pages with English translation.
Decision of Refusal of the Chinese application No. 202110343095.7, issued on Jan. 19, 2023. 15 pages with English translation.
First Office Action of the European application No. 19845035.5, issued on Apr. 11, 2022. 7 pages.
Lenovo et al: "Summary of [98#34][NR] On demand SI (Lenovo)", 3GPP Draft; R2-1707090 Email Disc Summary 98#34 On Demand SI, 3GPP, vol. RAN WG2, No. Qingdao, China; Jun. 27, 2017-Jun. 29, 2017, XP051301583. 35 pages.
Office Action of the Indian application No. 202127007841, issued on Jan. 21, 2022. 7 pages with English translation.
Samsung: "On Demand SI: Remaining Issues", 3GPP Draft; R2-1706527; 3GPP, vol. RAN WG2, No. Qingdao, China; Jun. 27, 2017-Jun. 29, 2017, XP051306476. 8 pages.
Second Office Action of the European application No. 19845035.5, issued on Oct. 18, 2022. 7 pages.
Second Office Action of the Chinese application No. 202110343095.7, issued on Oct. 19, 2022. 15 pages with X English translation.
First Office Action of the Chinese application No. 202110343095.7, issued on Jul. 27, 2022. 19 pages with English translation.
First Office Action of the Russian application No. 2021104439, issued on Jul. 22, 2022. 12 pages with English translation.
Written Opinion of the Singaporean application No. 11202100969P, issued on Oct. 3, 2022. 11 pages.
Supplementary European Search Report in the European application No. 19845035.5, mailed on Aug. 9, 2021. 8 pages.
Written Opinion of the International Search Authority in the international application No. PCT/CN2019/081996, mailed on Jun. 28, 2019. 7 pages.
International Search Report in the international application No. PCT/CN2019/081996, mailed on Jun. 28, 2019.
Notice of Allowance of the Chinese application No. 202110343095.7, issued on Sep. 13, 2023. 5 pages with English translation.
Hearing Notice of the Indian application No. 202127007841, issued on Dec. 6, 2023, 2 pages.
First Office Action of the Vietnamese application No. 1-2021-00770, issued on Jan. 18, 2024, 3 pages with English translation.
Notice of Rejection of the Indian application No. 202127007841, issued on Jan. 29, 2024, 2 pages.

* cited by examiner

RANDOM ACCESS METHOD AND DEVICE, AND COMPUTER STORAGE MEDIUM

CROSS REFERENCE TO RELATED APPLICATION

This application is a continuation of International Patent Application No. PCT/CN2019/081996 filed on Apr. 10, 2019, which claims priorities from Chinese Patent Application No. 201810866886.6 filed on Aug. 1, 2018, and Chinese Patent Application No. 201810936190.6 filed on Aug. 16, 2018, which are incorporated herein by reference in their entity.

TECHNICAL FIELD

Embodiments of the disclosure relate to the technical field of wireless communication, and particularly to a random access method and device, and a computer storage medium.

BACKGROUND

At present, a wireless communication system may be a multiple access system capable of supporting communication with multiple users by sharing available system resources (for example, time, frequency and power). As an example, a wireless multiple access communication system may include a plurality of base stations. Each base station simultaneously supports communication among multiple communication devices. These communication devices may be additionally called User Equipment (UE). The base station may communicate with a communication device on a downlink channel (for example, for transmission from the base station to the UE) and an uplink channel (for example, for transmission from the UE to the base station).

In some wireless communication systems, for example, a Long Term Evolution (LTE) system, a 5th generation (5G) system or a New Radio (NR) system, a wireless device may implement system access through a random access process. The random access process may be a contention-based random access process or a contention-free random access process. For implementing a contention-based random access process, a message4 random access procedure is adopted. An expected latency of the message4 random access procedure usually may reach 40 milliseconds (ms), resulting in inadaptability of the message4 random access procedure to a requirement of a low-latency service in a 5G system or an NR system.

SUMMARY

The embodiments of the disclosure provide a random access method and device and a computer storage medium, which can reduce a latency of a random access process and improve the time efficiency of the random access process.

The technical solutions of the disclosure are implemented as follows.

A first aspect provides a random access method, which may be applied to UE and include that: a random access response (RAR) message is received based on first identification information, the RAR message including second identification information; and a physical downlink control channel (PDCCH) is monitored in a preset time window based on the second identification information or third identification information associated with the second identification information, the PDCCH being scrambled through the second identification information or the third identification information.

A second aspect provides a random access method, which may be applied to a network device and include that: an RAR message is scrambled through first identification information and sent to UE, the RAR message including second identification information; a PDCCH to be sent is scrambled based on the second identification information or third identification information associated with the second identification information; and the scrambled PDCCH is sent to the UE.

A third aspect provides UE, which may include a first receiving part and a monitoring part.

The first receiving part may be configured to receive an RAR message based on first identification information, the RAR message including second identification information.

The monitoring part may be configured to detect a PDCCH in a preset time window based on the second identification information or third identification information associated with the second identification information, the PDCCH being scrambled through the second identification information or the third identification information.

A fourth aspect provides a network device, which may include a scrambling part and a second sending part.

The scrambling part may be configured to scramble an RAR message through first identification information.

The second sending part may be configured to send the scrambled RAR message to UE, the RAR message including second identification information.

The scrambling part may further be configured to scramble a PDCCH to be sent based on the second identification information or third identification information associated with the second identification information.

The second sending part may further be configured to send the scrambled PDCCH to the UE.

A fifth aspect provides UE, which may include a first network interface, a first memory and a first processor. The first network interface may be configured to receive and send a signal in a process of receiving and sending information from and to another external network element. The first memory may be configured to store a computer program capable of running in the first processor. The first processor may be configured to run the computer program to execute the operations of the method of the first aspect.

A sixth aspect provides a network device, which may include a second network interface, a second memory and a second processor. The second network interface may be configured to receive and send a signal in a process of receiving and sending information from and to another external network element. The second memory may be configured to store a computer program capable of running in the second processor. The second processor may be configured to run the computer program to execute the operations of the method of the second aspect.

A seventh aspect provides a computer storage medium, which may store a program for random access, the program for random access being executed by at least one processor to implement the operations of the random access method of the first aspect or the second aspect.

Through the technical solutions, UE, after completing transmission of a preamble, may detects a PDCCH based on second identification information in an RAR to determine whether a contention is resolved or not. The contention is not needed to be resolved by, as in a message4 random access procedure, sending a radio resource control (RRC) message to a network device and then receiving a contention resolution message fed back by the network device in response to the RRC signaling. Therefore, a contention-based random access process may be completed through a message2 procedure, a latency of the random access process may be reduced, and the time efficiency of the random access process may be improved.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
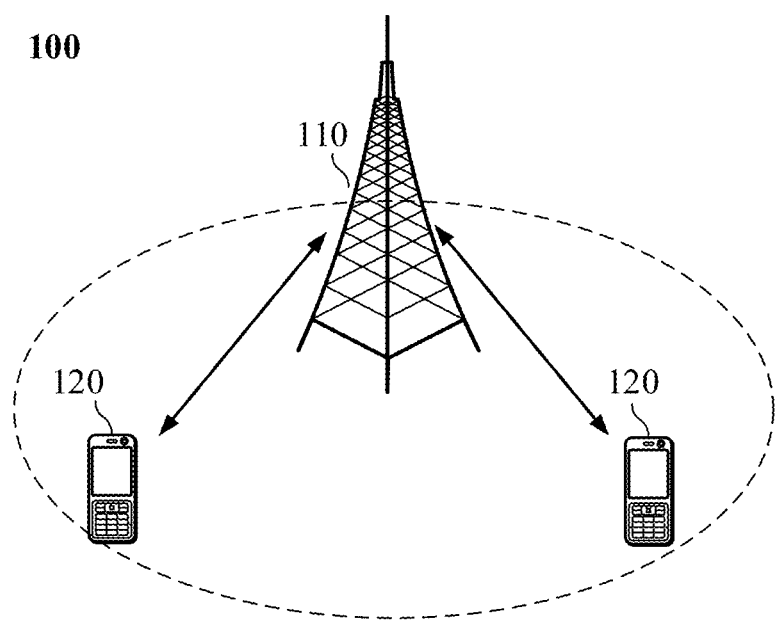
FIG. 1 is an example diagram of a wireless communication system according to an embodiment of the disclosure.

Referring to FIG. 1, an example of a wireless communication system 100 that may be adopted to reduce a latency in a random access process in wireless communication according to an embodiment of the disclosure is shown. The communication system 100 may include a network device 110, and the network device 110 may be a device communicating with a terminal device 120 (or called a communication terminal and a terminal). The network device 110 may provide a communication coverage for a specific geographical region and may communicate with a terminal device located in the coverage. Optionally, the network device 110 may be a Base Transceiver Station (BTS) in a Global System for Mobile communications (GSM) or a Code Division Multiple Access (CDMA) system, may also be a NodeB (NB) in a Wideband Code Division Multiple Access (WCDMA) system, or may also be an Evolutional Node B (eNB or eNodeB) in an LTE system or a wireless controller in a Cloud Radio Access Network (CRAN). Or the network device may be a mobile switching center, a relay station, an access point, a vehicle device, a wearable device, a hub, a switch, a network bridge, a router, a network-side device or 5G base station (gNB) in a 5G network, a network device in a future evolved Public Land Mobile Network (PLMN) or the like.

The communication system 100 may further include at least one terminal device 120 within the coverage of the network device 110. The "terminal device" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or a palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called an NR system or an NR network.

A network device and two terminal devices are exemplarily shown in FIG. 1. Optionally, the communication system 100 may include multiple network devices and another number of terminal devices may be included in coverage of each network device. No limits are made thereto in the embodiments of the disclosure.

For the wireless communication system 100 shown in FIG. 1, the terminal device 120 may have a requirement of accessing the network device 110, thereby triggering a random access process. For example, events triggering the random access process may include, but not limited to, the following conditions: the condition that the terminal device 120 initially accesses the wireless communication system 100; the condition that the terminal device 120 is out of sync with the wireless communication system 100; the condition that an RRC connection is reestablished between the terminal device 120 and the network device 110 in some handover processes of handover of the terminal device 120 between different network devices 110; the condition that the terminal device 120 is switched from an inactive state RRC_I-NACTIVE; or the condition that the terminal device 120 is indicated by other System Information (SI).

Responsive to triggering of a random access process, contention-based random access is usually implemented by a message4 procedure in a related standard or protocol. For example, the wireless communication system 100 is a 5G system, the network device 110 may be a gNB, and the terminal device 120 may be UE. A specific process refers to FIG. 2.

In S210, UE sends a selected random access preamble on a selected physical random access channel (PRACH) resource.

It can be understood that, in this operation, the UE may send the random access preamble through a Message 1 (Msg1). The gNB, after receiving the Msg1, may estimate uplink timing and a size of a grant required by the terminal for transmission of a Message 3 (Msg3) based on the preamble.

In S220, the gNB sends an RAR to the UE.

It is to be noted that the gNB may send the RAR through a Message 2 (Msg2). The UE, after sending the Msg1, may enable an RAR window, monitor a PDCCH in the RAR window and, after detecting the PDCCH, obtain a physical downlink shared channel (PDSCH) scheduled by the PDCCH. The RAR may be included in the PDSCH. In a case that the UE does not obtain the RAR in the RAR window, the random access process fails.

In S230, the UE sends an RRC message.

It is to be noted that the RRC message may be sent through the Msg3. The Msg3 is mainly configured to notify an event triggering the random access process to a network. For example, in case of an initial random access process, the Msg3 may contain a UE Identifier (ID) and an establishment cause. In case of RRC reestablishment, a connected-state UE ID and an establishment cause may be included in the Msg3.

In addition, a contention may be resolved in S240 through the UE ID included in the Msg3.

In S240, the gNB feeds back a contention resolution message to the UE.

It can be understood that, in this operation, the contention resolution message may be transmitted through a Message 4 (Msg4). The Msg4 plays two roles in, first, resolving the contention and second, transmitting an RRC configuration message to the UE. For contention resolution, the following two manners may be adopted.

A first manner: in a case that the UE may include a cell radio network temporary identifier (C-RNTI) in S230, the Msg4 may be scheduled by a PDCCH scrambled through the C-RNTI.

A second manner: in a case that the UE does not contain a C-RNTI in S230, for example, under an initial access condition, the Msg4 is scheduled by a PDCCH scrambled through a Temporary C-RNTI (TC-RNTI). The contention is resolved by matching a common control channel service data unit (CCCH SDU) in a PDSCH through which the UE receives the Msg4.

Figure 2:
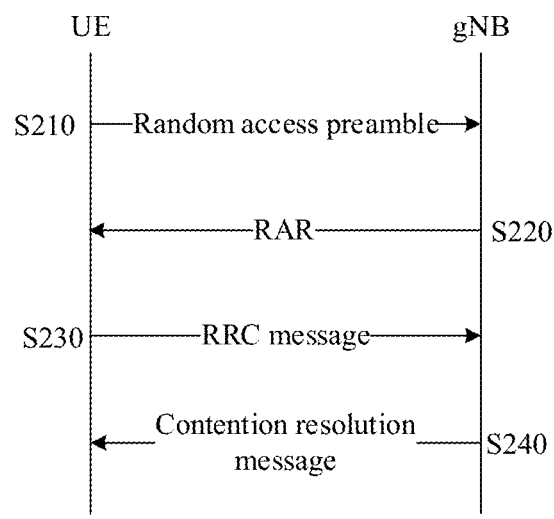
FIG. 2 is a flowchart of a message4 random access procedure according to the related art.

It can be seen from the random access process shown in FIG. 2 that a latency in the random access process of the message4 procedure may be increased, which may bring negative influence to a low-latency service in a 5G system. Therefore, the random access process of the original message4 procedure is expected to be implemented through a message2 procedure. For implementation of contention-based random access through the message2 procedure, it is necessary to solve following problems: how to resolve a contention, and contents needed to be transmitted through two messages respectively in the message2 procedure.

Figure 3:
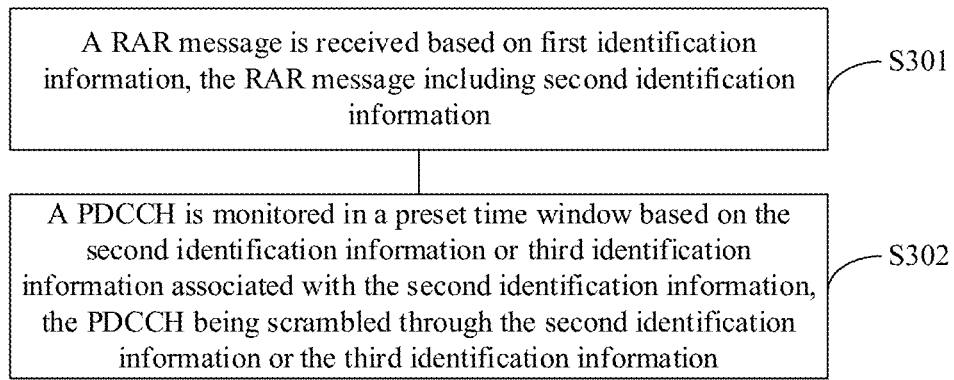
FIG. 3 is a flowchart of a random access method according to an embodiment of the disclosure.

Based on the two problems that need to be solved, referring to FIG. 3, a random access method provided in an embodiment of the disclosure is shown. The method may be applied to UE such as a terminal device 120 shown in FIG. 1. The method may include the following operations.

In S301, an RAR message is received based on first identification information, the RAR message including second identification information.

In S302, a PDCCH is monitored in a preset time window based on the second identification information or third identification information associated with the second identification information, the PDCCH being scrambled through the second identification information or the third identification information.

Through the technical solution shown in FIG. 3, the UE may monitor the PDCCH based on the second identification information included in an RAR or based on the third identification information associated with the second identification information, and after successfully descrambling the PDCCH, may receive a PDSCH scheduled by the PDCCH. Therefore, a contention may be resolved when the UE receives the RAR message, a contention-based random access process may be completed through a message2 procedure, a latency of the random access process may be reduced, and the time efficiency of the random access process may be improved.

For the technical solution shown in FIG. 3, before S301, the UE is further required to send a preamble to a network device, for example, an eNB or a gNB. Therefore, in an implementation mode, the method may further include the following operation.

The preamble may be sent on a configured PRACH resource, and a UE ID may be sent on a configured uplink resource.

The UE ID represents uniqueness of the UE. Specifically, the UE may include any one of: a 5G system architecture evolution (SAE) temporary mobile subscriber identity (5G-S-TMSI); part of the 5G-S-TMSI; a C-RNTI; the C-RNTI, a physical cell identifier (PCI) and a short Media access control identifier (short MAC I); and a resume ID.

For the UE ID, it is to be noted that the UE ID may uniquely distinguish the UE, so that there is a mapping relationship between IDs. That is, taking the C-RNTI as an example, for the same UE, all other IDs than the C-RNTI may be mapped to the C-RNTI. For these IDs, the 5G-S-TMSI may uniquely distinguish the UE, but a length of the 5G-S-TMSI is usually relatively great. For reducing the length of the 5G-S-TMSI, the UE may optionally negotiate with the network device to uniquely distinguish the UE through part of the 5G-S-TMSI. In addition, the network device may optionally pre-configure part of the 5G-S-TMSI for the UE to uniquely distinguish the UE. The resume ID may be a UE ID through which a UE context may be conveniently retrieved in the network device, and may usually be used when the UE is switched from an RRC inactive state to an RRC connected state.

In the implementation mode, the configured uplink resource may include a physical uplink control channel (PUCCH) resource and/or a physical uplink shared channel (PUSCH) resource. It can be understood that the UE ID, as a type of control information, may be transmitted through a PUCCH. While, a PUSCH may be used for transmitting not only data but also control information. Therefore, the UE ID may also be transmitted to the network device through the PUSCH.

For the two configured uplink resources, it is to be noted that the configured uplink resource has a mapping relationship with a PRACH resource. That is, when the UE sends the preamble through a certain PRACH resource, an uplink resource corresponding to the PRACH resource and configured to transmit the UE ID may be determined according to the mapping relationship.

For the technical solution shown in FIG. 3, the first identification information is optionally a random access radio network temporary identifier (RA-RNTI). The UE may determine the RA-RNTI based on the PRACH resource for sending the preamble, for example, based on a time-domain resource, a frequency-domain resource and a code-domain resource.

For the technical solution, as a possible implementation mode, when the transmitted UE ID is a C-RNTI, the first identification information may correspondingly include the C-RNTI. In such case, the operation that the RAR message is received based on the first identification information may include that: the RAR message is received based on the C-RNTI.

After the RAR message is successfully received, it is indicated that the UE has successfully completed random access. In such case, the UE may not continue monitoring the PDCCH scrambled through the second identification information or the third identification information. Therefore, the method may further include that: after the RAR message is received, the PDCCH scrambled through the second identification information or the third identification information is stopped to be monitored.

For the technical solution shown in FIG. 3, since the PDCCH is scrambled through the second identification information or the third identification information associated with the third identification information, the second identification information may also be an ID configured to uniquely distinguish the UE so as to resolve the contention. Based on this, the second identification information may include any one of: a 5G-S-TMSI; part of the 5G-S-TMSI; a C-RNTI; the C-RNTI, a PCI and a short MAC I; and a resume ID.

It can be seen that an optional range of the second identification information may be consistent with an optional range of the UE ID. The UE may be uniquely distinguished through the information, for example the UE may be uniquely distinguished through the 5G-S-TMSI and the C-RNTI, therefore, a content in the second identification information may be inconsistent with a content in the UE ID that is sent.

In the technical solution shown in FIG. 3, the preset time window in S302 may be an RAR window for monitoring the RAR after the UE completes sending the preamble, or may also be a time window configured by the network device. No elaborations are made thereto in the embodiment.

The PDCCH may be monitored based on the second identification information in S302. The UE may descramble the PDCCH through the second identification information or the third identification information associated with the second identification information. Therefore, the contention may be resolved through this operation. Therefore, S302 may specifically be implemented through the following optional examples.

A first optional example: the operation that the PDCCH is monitored based on the second identification information may include the following operations.

When the UE ID transmitted through the uplink resource is the C-RNTI and the second identification information included in the RAR message is the C-RNTI, the PDCCH may be monitored through the C-RNTI or another ID associated with the C-RNTI. Responsive to that the PDCCH is successfully detected, it can be determined that the contention is resolved.

For the example, specifically, the network device may usually scramble the PDCCH through a C-RNTI or another ID associated with a C-RNTI. When the UE ID sent by the UE on the configured uplink resource is the C-RNTI, the network device may scramble the PDCCH directly through the C-RNTI, so that, when the UE successfully descrambles the PDCCH through the C-RNTI, it may be indicated that the contention is resolved.

A second optional example: the operation that the PDCCH is monitored based on the second identification information may include the following operations.

When the UE ID transmitted through the uplink resource is other ID than a C-RNTI and the second identification information included in the RAR message is a C-RNTI, the PDCCH may be monitored through the C-RNTI or said other ID associated with the C-RNTI. Responsive to that the PDCCH is successfully detected and an ID in a CCCH SDU transmitted by the PDSCH scheduled by the detected PDCCH is consistent with the UE ID transmitted through the uplink resource, it may be determined that the contention is resolved.

In the second optional example, the UE ID sent by the UE on the configured uplink resource is not the C-RNTI but, for example, the 5G-S-TMSI or part of the 5G-S-TMSI. However, the network device scrambles the PDCCH through the C-RNTI or another ID associated with the C-RNTI, so that the second identification information included in the RAR message is the C-RNTI or said another ID associated with the C-RNTI. In such case, the UE may monitor the PDCCH based on the second identification information, i.e., the C-RNTI or said another ID associated with the C-RNTI. In a case that the PDCCH is successfully detected, the PDSCH may be scheduled based on the PDCCH. Responsive to determining that the ID in the CCCH SDU transmitted by the PDSCH is consistent with the UE ID sent through the configured uplink resource, the UE may determine that the contention is resolved.

Specifically, "being consistent" may include two meanings. First, "being consistent" may be expressed as that the ID in the CCCH SDU transmitted by the PDSCH is completely consistent with the UE ID sent through the configured uplink resource. Second, "being consistent" may be considered as being consistent to a specific extent, namely "deemed to be consistent", namely, when first N bits, for example, 48 bits, in the CCCH SDU transmitted by the PDSCH are the same as first N bits transmitted on the uplink resource, it may be determined that the two are "consistent".

A third optional example: the operation that the PDCCH is monitored based on the third identification information associated with the second identification information may include the following operations.

When the UE ID transmitted through the uplink resource is other ID than a C-RNTI and the second identification information included in the RAR message is matched with said other ID, it may be determined that the contention is resolved, and the PDCCH may be monitored based on the C-RNTI in a mapping relationship with the second identification information.

In the third optional example, the UE ID sent by the UE on the configured uplink resource is not the C-RNTI but, for example, the 5G-S-TMSI. However, the second identification information included in the RAR message is another ID matched with the 5G-S-TMSI, for example, part of the 5G-S-TMSI. In such case, the UE may determine that the contention is resolved. The UE may acquire the C-RNTI in a mapping relationship with the part of the 5G-S-TMSI, thereby continuing monitoring the PDCCH based on the C-RNTI. It is to be noted that the mapping relationship may be considered as a special closer association relationship. The mapping relationship may be configured for the UE in advance by the network device or may also be determined according to a rule specified in an existing protocol.

For the technical solution shown in FIG. 3, it is to be noted that, in a case that the UE cannot monitor the PDCCH in the preset time window, it is indicated that the contention fails to be resolved. Therefore, the UE may re-execute the random access to the network device.

Through the random access method, it can be seen that UE, after completing sending a preamble, may monitor a PDCCH based on second identification information in a RAR to determine whether a contention is resolved or not. The contention is not required to be resolved by sending an RRC message to the network device and then receiving a contention resolution message fed back by the network device in response to the RRC signaling, as done in a message4 random access procedure. Therefore, a contention-based random access process may be completed through a message2 procedure, a latency of the random access process may be reduced, and the time efficiency of the random access process may be improved.

Figure 4:
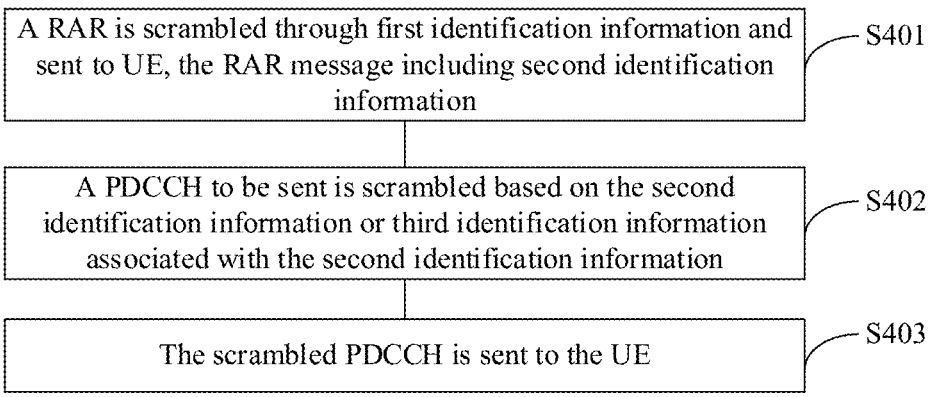
FIG. 4 is a flowchart of another random access method according to an embodiment of the disclosure.

Based on the same application concept of the abovementioned technical solution, referring to FIG. 4, a random access method provided in an embodiment of the disclosure is shown. The method may be applied to a network device such as an eNB or gNB shown in FIG. 1. The method may include the following operations.

In S401, an RAR message is scrambled through first identification information and sent to UE, the RAR message including second identification information.

In S402, a PDCCH to be sent is scrambled based on the second identification information or third identification information associated with the second identification information.

In S403, the scrambled PDCCH is sent to the UE.

It is to be noted that, for the technical solution shown in FIG. 4, the network device may send the scrambled PDCCH to the UE. When the UE may successfully scramble the PDCCH based on the second identification information or the third identification information, it is indicated that a contention-based access contention is resolved. Accordingly, a contention-based random access process may be completed through a message2 procedure, a latency of the random access process may be reduced, and the time efficiency of the random access process may be improved.

For the technical solution shown in FIG. 4, in a possible implementation mode, before S401, the method may further include the following operation.

A preamble sent by the UE may be received, and a UE ID may be received on a configured uplink resource.

The UE ID may be configured to represent uniqueness of the UE. Specifically, the UE ID may include any one of: a 5G-S-TMSI; part of the 5G-S-TMSI; a C-RNTI; the C-RNTI, a PCI and a short MAC I; and a resume ID.

For the UE ID, it is to be noted that the UE ID may uniquely distinguish the UE, so that there is a mapping relationship between each ID. That is, taking the C-RNTI as an example, for the same UE, all other IDs than the C-RNTI may be mapped to the C-RNTI.

In the implementation mode, the configured uplink resource may include a PUCCH resource and/or a PUSCH resource. Moreover, the configured uplink resource has a mapping relationship with a PRACH resource. That is, when the UE sends the preamble through a certain PRACH resource, an uplink resource corresponding to the PRACH resource and configured to transmit the UE ID may be determined according to the mapping relationship.

For the technical solution shown in FIG. 4, the first identification information is optionally an RA-RNTI.

For the technical solution shown in FIG. 4, since the PDCCH is scrambled through the second identification information or the third identification information associated with the third identification information, the second identification information may also be an ID configured to uniquely distinguish the UE so as to resolve the contention. Based on this, the second identification information may include any one of: a 5G-S-TMSI; part of the 5G-S-TMSI; a C-RNTI; the C-RNTI, a PCI and a short MAC I; and a resume ID.

It can be seen that an optional range of the second identification information is consistent with an optional range of the UE ID. Since the UE may be uniquely distinguished through the information, for example the UE may be uniquely distinguished through the 5G-S-TMSI and the C-RNTI, a content in the second identification information may be inconsistent with a content in the UE ID that is sent.

For the technical solution shown in FIG. 4, it is to be noted that, after the scrambled PDCCH is sent to the UE, the UE may descramble the PDCCH through the second identification information or the third identification information associated with the second identification information, thereby resolving the contention. Therefore, the operation in S402 that the PDCCH to be sent is scrambled based on the second identification information or the third identification information associated with the second identification information may be implemented through the following optional examples.

A first optional example

The operation that the PDCCH to be sent is scrambled based on the second identification information or the third identification information associated with the second identification information may include the following operation.

When the UE ID transmitted through the uplink resource is a C-RNTI and the second identification information included in the RAR message is a C-RNTI, the PDCCH to be sent is scrambled through the C-RNTI or another ID associated with the C-RNTI.

A second optional example

The operation that the PDCCH to be sent is scrambled based on the second identification information or the third identification information associated with the second identification information may include the following operation.

When the UE ID transmitted through the uplink resource is other ID than a C-RNTI and the second identification information included in the RAR message is a C-RNTI, the PDCCH to be sent is scrambled through the C-RNTI or said other ID associated with the C-RNTI.

A third optional example

The operation that the PDCCH to be sent is scrambled based on the second identification information or the third identification information associated with the second identification information may include the following operation.

When the UE ID transmitted through the uplink resource is other ID than a C-RNTI and the second identification information included in the RAR message is matched with said other ID, the PDCCH to be sent is scrambled through the C-RNTI in a mapping relationship with the second identification information.

It can be understood that, in the technical solution, the three optional examples correspond to the optional examples in the technical solution shown in FIG. 3 and will not be specifically elaborated.

For the technical solution shown in FIG. 4, in a possible implementation mode, in a case that the network device does not receive any feedback from the UE for PDCCH monitoring in a preset time window, it may be determined that a contention fails to be resolved. In such case, the network device may re-execute the random access to the UE.

Through the random access method, it can be seen that a network device may scramble a PDCCH based on second identification information in an RAR to enable UE to monitor the PDCCH based on the second identification information to determine whether a contention is resolved or not. The contention is not required to be resolved by sending an RRC message to the network device and then receiving a contention resolution message fed back by the network device in response to the RRC signaling, as done in a message4 random access procedure. Accordingly, a contention-based random access process may be completed through a message2 procedure, a latency of the random access process may be reduced, and the time efficiency of the random access process may be improved.

Figure 5:
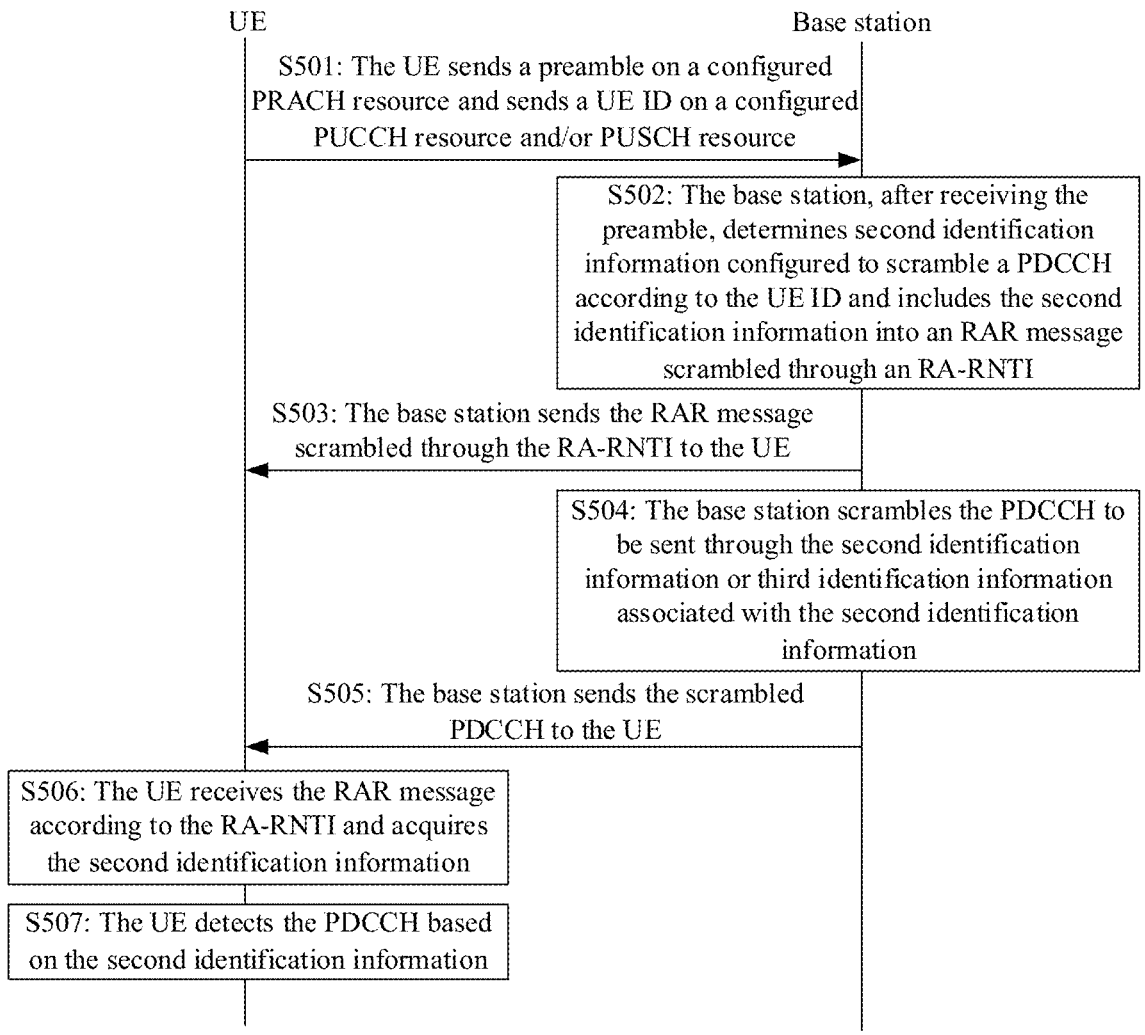
FIG. 5 is a schematic diagram of a specific random access process according to an embodiment of the disclosure.

Based on the same application concept of the abovementioned technical solutions, referring to FIG. 5, a specific random access method provided in an embodiment of the disclosure is shown. The process may be applied to UE and a base station such as a gNB or an eNB. The process may include the following operations.

In S501, the UE sends a preamble on a configured PRACH resource and sends a UE ID on a configured PUCCH resource and/or PUSCH resource.

It is to be noted that, in the technical solution, the configured PUCCH resource and/or PUSCH resource may correspond to the configured PRACH resource. That is, when the UE sends the preamble through a certain PRACH resource, an uplink resource corresponding to the PRACH resource and configured to transmit the UE ID may be determined according to a mapping relationship.

The UE ID may represent uniqueness of the UE. Specifically, the UE ID may include any one of: a 5G-S-TMSI; part of the 5G-S-TMSI; a C-RNTI; the C-RNTI, a PCI and a short MAC I; and a resume ID. For the UE ID, it is to be noted that the UE ID may uniquely distinguish the UE, so that there is a mapping relationship between IDs. That is, taking the C-RNTI as an example, for the same UE, all other IDs than the C-RNTI may be mapped to the C-RNTI.

In S502, the base station, after receiving the preamble, determines second identification information configured to scramble a PDCCH according to the UE ID and includes the second identification information into an RAR message scrambled through an RA-RNTI.

It is to be noted that, after the base station determines the second identification information configured to scramble the PDCCH, a contention may be resolved. The second identification information may be determined by the UE ID, so that the second identification information may include any one of: a 5G-S-TMSI; part of the 5G-S-TMSI; a C-RNTI; the C-RNTI, a PCI and a short MAC I; and a resume ID.

It can be seen that an optional range of the second identification information is consistent with an optional range of the UE ID. The UE may be uniquely distinguished through the information, for example the UE may be uniquely distinguished through the 5G-S-TMSI and the C-RNTI. Based on the distinguishing uniqueness of the UE, a content in the second identification information may optionally be inconsistent with a content in the UE ID sent by the UE.

In S503, the base station sends the RAR message scrambled through the RA-RNTI to the UE.

The RAR message may include the second identification information.

In S504, the base station scrambles the PDCCH to be sent through the second identification information or third identification information associated with the second identification information.

S504 may be implemented through the following examples.

A first example

When the UE ID transmitted through the uplink resource is a C-RNTI and the second identification information included in the RAR message is a C-RNTI, the PDCCH to be sent is scrambled through the C-RNTI or another ID associated with the C-RNTI.

A second example

When the UE ID transmitted through the uplink resource is other ID than a C-RNTI and the second identification information included in the RAR message is a C-RNTI, the PDCCH to be sent is scrambled through the C-RNTI or said other ID associated with the C-RNTI.

A third example

When the UE ID transmitted through the uplink resource is other ID than a C-RNTI and the second identification information included in the RAR message is matched with said other ID, the PDCCH to be sent is scrambled through the C-RNTI in a mapping relationship with the second identification information.

In S505, the base station sends scrambled PDCCH to the UE.

In S506, the UE receives the RAR message according to the RA-RNTI and acquires the second identification information.

In S507, the UE monitors the PDCCH based on the second identification information.

It is to be noted that the UE may monitor the PDCCH in a preset time window. The preset time window may be an RAR window for monitoring the RAR after the UE completes sending the preamble or may also be a time window configured by the base station.

Corresponding to the three examples of S504, S507 may also be implemented through three corresponding examples.

A first example

When the UE ID transmitted through the uplink resource is a C-RNTI and the second identification information included in the RAR message is a C-RNTI, the PDCCH is monitored through the C-RNTI or another ID associated with the C-RNTI.

Responsive to that the PDCCH is successfully detected, it may be determined that a contention is resolved.

A second example

When the UE ID transmitted through the uplink resource is other ID than a C-RNTI and the second identification information included in the RAR message is a C-RNTI, the PDCCH is monitored through the C-RNTI or said other ID associated with the C-RNTI.

Responsive to that the PDCCH is successfully detected and an ID in a CCCH SDU transmitted by a PDSCH scheduled by the detected PDCCH is consistent with the UE ID transmitted through the uplink resource, it may be determined that the contention is resolved.

A third example

When the UE ID transmitted through the uplink resource is other ID than a C-RNTI and the second identification information included in the RAR message is matched with said other ID, it is determined that a contention is resolved, and the PDCCH is monitored based on the C-RNTI in the mapping relationship with the second identification information.

It is to be noted that, for the UE, in a case that the UE cannot monitor the PDCCH in the preset time window, it is indicated that the contention fails to be resolved. Therefore, the UE may re-execute the random access to the base station.

For the base station, in a case that the base station does not receive any feedback from the UE for PDCCH monitoring in the preset time window, it may be determined that the contention fails to be resolved. In such case, the base station may re-execute the random access to the UE.

Through the specific random access process provided in the technical solution, UE, after completing sending a preamble, may monitor a PDCCH based on second identification information in a RAR to determine whether a contention is resolved or not. The contention is not required to be resolved by sending an RRC message to the base station and then receiving a contention resolution message fed back by the base station in response to the RRC signaling, such as done in a message4 random access procedure. Accordingly, a contention-based random access process may be completed through a message2 procedure, a latency of the random access process may be reduced, and the time efficiency of the random access process may be improved.

Figure 6:
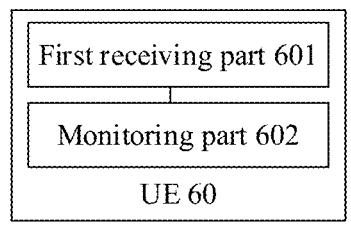
FIG. 6 is a schematic composition diagram of UE according to an embodiment of the disclosure.

Based on the same application concept of the technical solutions shown in FIG. 3 to FIG. 5, a composition of UE 60 provided in an embodiment of the disclosure is shown in FIG. 6, which may include a first receiving part 601 and a monitoring part 602.

The first receiving part 601 is configured to receive an RAR message based on first identification information, the RAR message including second identification information.

The monitoring part 602 is configured to monitor a PDCCH in a preset time window based on the second identification information or third identification information associated with the second identification information, the PDCCH being scrambled through the second identification information or the third identification information.

Figure 7:
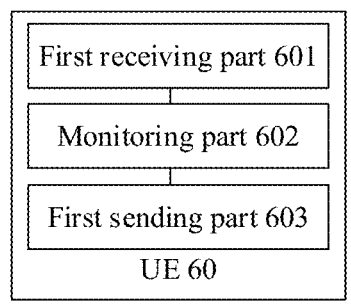
FIG. 7 is a schematic composition diagram of another UE according to an embodiment of the disclosure.

Based on the UE 60 shown in FIG. 6, in a possible implementation mode, referring to FIG. 7, a first sending part 603 may further be included and is configured to send a preamble on a configured PRACH resource and send a UE ID on a configured uplink resource.

In the implementation mode, optionally, the UE ID may include any one of: a 5G-S-TMSI; part of the 5G-S-TMSI; a C-RNTI; the C-RNTI, a PCI and a short MAC I; and a resume ID.

In the implementation mode, optionally, the configured uplink resource may include a PUCCH resource and/or a PUSCH resource.

In the implementation mode, optionally, the configured uplink resource has a mapping relationship with the PRACH resource.

Based on the UE 60 shown in FIG. 6, in a possible implementation mode, the first identification information may include an RA-RNTI.

Based on the UE 60, responsive to that the UE ID is a C-RNTI, the first receiving part 602 is configured to receive the RAR message based on the C-RNTI.

Based on this, the monitoring part 602 is further configured to, after the first receiving part 601 receives the RAR message, stop monitoring the PDCCH scrambled through the second identification information or the third identification information.

Based on the UE 60 shown in FIG. 6, in a possible implementation mode, the second identification information includes any one of: a 5G-S-TMSI; part of the 5G-S-TMSI; a C-RNTI; the C-RNTI, a PCI and a short MAC I; and a resume ID.

In the implementation mode, optionally, there is a possibility that a content in the second identification information is inconsistent with a content in the UE ID.

Based on the UE 60 shown in FIG. 6, in a possible implementation mode, the preset time window may include an RAR window for monitoring the RAR message or a time window configured by a network device.

Based on the solution, the monitoring part 602 is configured to, when the UE ID transmitted through the uplink resource is a C-RNTI and the second identification information included in the RAR message is a C-RNTI, monitor the PDCCH through the C-RNTI or another ID associated with the C-RNTI, and responsive to that the PDCCH is successfully detected, determine that a contention is resolved.

Based on the solution, the monitoring part 602 is configured to, when the UE ID transmitted through the uplink resource is other ID than a C-RNTI and the second identification information included in the RAR message is a C-RNTI, monitor the PDCCH through the C-RNTI or said other ID associated with the C-RNTI, and responsive to that the PDCCH is successfully detected and an ID in a CCCH SDU transmitted by a PDSCH scheduled by the PDCCH is consistent with the UE ID transmitted through the uplink resource, determine that the contention is resolved.

Based on the solution, the monitoring part 602 is configured to, when the UE ID transmitted through the uplink resource is other ID than a C-RNTI and the second identification information included in the RAR message is matched with said other ID, determine that the contention is resolved and monitor the PDCCH based on the C-RNTI in a mapping relationship with the second identification information.

It can be understood that, in the embodiment, "part" may be part of a circuit, part of a processor, part of a program or software and the like. The "part" may also be a unit, or may also be modular and non-modular.

In addition, each component in the embodiment may be integrated into a processing unit. Each unit may also exist independently. Two or more than two units may also be integrated into a unit. The integrated unit may be implemented in a hardware form or may also be implemented in form of software function module.

When implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product. The computer software product may be stored in a storage medium, including a plurality of instructions configured to enable a computer device (which may be a personal computer, a server, a network device or the like) or a processor to implement all or part of the operations of the method in the embodiment. The storage medium may include: various media capable of storing program codes such as a U disk, a mobile hard disk, a Read-Only Memory (ROM), a Random Access Memory (RAM), a magnetic disk or an optical disk.

Therefore, some embodiment provide a computer storage medium, which stores a program for random access, the program for random access being executed by at least one processor to implement the operations of the random access method shown in FIG. 3.

Figure 8:
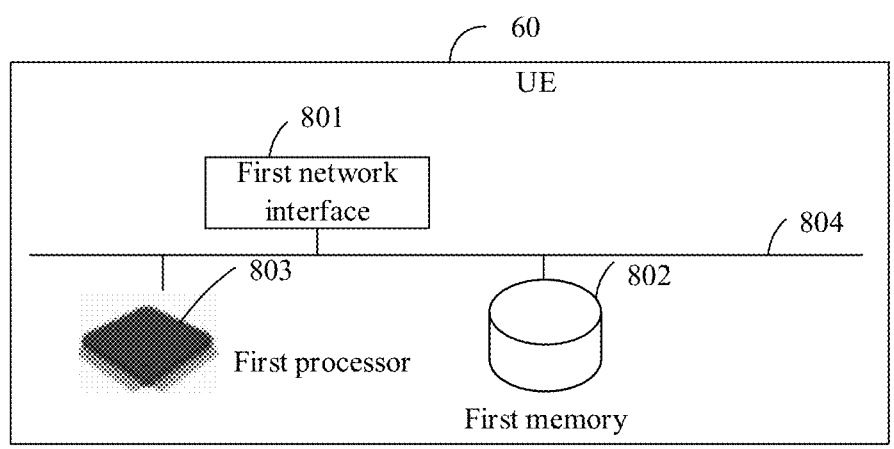
FIG. 8 is a specific hardware structure diagram of UE according to an embodiment of the disclosure.

Based on the UE 60 and the computer storage medium, a specific hardware structure of the UE 60 provided in the embodiment of the disclosure is shown in FIG. 8, and may include a first network interface 801, a first memory 802 and a first processor 803. Each component is coupled together through a bus system 804. It can be understood that the bus system 804 is configured to implement connection communication between these components. The bus system 804 may include a data bus and further include a power bus, a control bus and a state signal bus. However, for clear description, various buses in FIG. 8 are marked as the bus system 804. The first network interface 801 is configured to receive and send a signal in a process of receiving and sending information from and to another external network element.

The first memory 802 is configured to store a computer program capable of running in the first processor 803.

The first processor 803 is configured to run the computer program to execute the operations of receiving an RAR message based on first identification information, the RAR message containing second identification information, and monitoring a PDCCH in a preset time window based on the second identification information or third identification information associated with the second identification information. The PDCCH may be scrambled through the second identification information or the third identification information.

It can be understood that the first memory 802 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DRRAM). It is to be noted that the first memory 802 of a system and method described in the disclosure is intended to include, but not limited to, memories of these and any other proper types.

The first processor 803 may be an integrated circuit chip with a signal processing capability. In an implementation process, each operation of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 802. The first processor 803 may read information from the first memory 802 and complete the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Specifically, the first processor 803 in the UE 60 is further configured to run the computer program to implement the operations of the random access method in the technical solution shown in FIG. 3. Elaborations are omitted herein.

Figure 9:
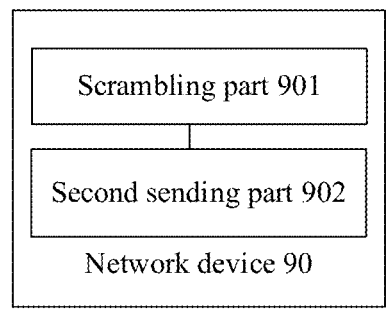
FIG. 9 is a schematic composition diagram of a network device according to an embodiment of the disclosure.

Based on the same application concept of the technical solutions shown in FIG. 3 to FIG. 5, a composition of a network device 90 provided in an embodiment of the disclosure is shown in FIG. 9, which may include a scrambling part 901 and a second sending part 902.

The scrambling part 901 is configured to scramble an RAR message through first identification information.

The second sending part 902 is configured to send the scrambled RAR message to UE, the RAR message including second identification information.

The scrambling part 901 is further configured to scramble a PDCCH to be sent based on the second identification information or third identification information associated with the second identification information.

The second sending part 902 is further configured to send the scrambled PDCCH to the UE.

Figure 10:
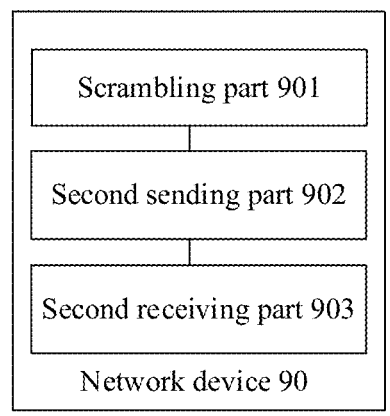
FIG. 10 is a schematic composition diagram of another network device according to an embodiment of the disclosure.

Based on the network device 90 shown in FIG. 9, in a possible implementation mode, a second receiving part 903 may further be included as shown in FIG. 10, and is configured to receive a preamble from the UE and receive a UE ID on a configured uplink resource.

In the implementation mode, optionally, the UE ID may include any one of: a 5G-S-TMSI; part of the 5G-S-TMSI; a C-RNTI; the C-RNTI, a PCI and a short MAC I; and a resume ID.

Based on the network device 90 shown in FIG. 9, in a possible implementation mode, the first identification information includes an RA-RNTI.

Based on the network device 90 shown in FIG. 9, in a possible implementation mode, the second identification information includes any one of: a 5G-S-TMSI; part of the 5G-S-TMSI; a C-RNTI; the C-RNTI, a PCI and a short MAC I; and a resume ID.

In the implementation mode, optionally, there is a possibility that a content in the second identification information is inconsistent with a content in the UE ID.

Based on the solution, the scrambling part 901 is configured to, when the UE ID transmitted through the uplink resource is a C-RNTI and the second identification information included in the RAR message is a C-RNTI, scramble the PDCCH to be sent through the C-RNTI or another ID associated with the C-RNTI.

Based on the solution, the scrambling part 901 is configured to, when the UE ID transmitted through the uplink resource is other ID than a C-RNTI and the second identification information included in the RAR message is a C-RNTI, scramble the PDCCH to be sent through the C-RNTI or another ID associated with the C-RNTI.

Based on the solution, the scrambling part 901 is configured to, when the UE ID transmitted through the uplink resource is other ID than a C-RNTI and the second identification information included in the RAR message is matched with said other ID, scramble the PDCCH to be sent through a C-RNTI in a mapping relationship with the second identification information.

In addition, the embodiment provides a computer storage medium, which stores a program for random access. The program for random access may be executed by at least one processor to implement the operations of the random access method in the technical solution shown in FIG. 4. Specific elaborations about the computer storage medium refer to the corresponding descriptions in the abovementioned technical solution and are omitted herein.

Figure 11:
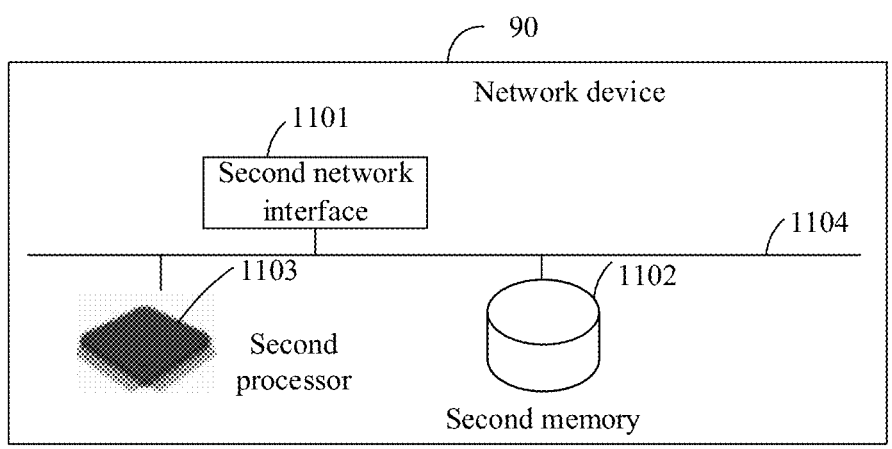
FIG. 11 is a specific hardware structure diagram of another network device according to an embodiment of the disclosure.

Based on the network device 90 and the computer storage medium, a specific hardware structure of the network device 90 provided in the embodiment of the disclosure is shown in FIG. 11, which includes a second network interface 1101, a second memory 1102 and a second processor 1103. Each component is coupled together through a bus system 1104. It can be understood that the bus system 1104 is configured to implement connection communication between these components. The bus system 1104 may include a data bus and further include a power bus, a control bus and a state signal bus. However, for clear description, various buses in FIG. 11 are marked as the bus system 1104. Herein, The second network interface 1101 is configured to receive and send a signal in a process of receiving and sending information from and to another external network element.

The second memory 1102 is configured to store a computer program capable of running in the second processor 1103.

The second processor 1103 is configured to run the computer program to execute the operations of: scrambling an RAR message through first identification information and sending it to UE, the RAR message including second identification information; scrambling a PDCCH to be sent based on the second identification information or third identification information associated with the second identification information; and sending the scrambled PDCCH to the UE.

It can be understood that parts in the specific hardware structure of the network device 90 in the embodiment are similar to the corresponding parts described in the abovementioned technical solutions and will not be elaborated herein.

Specifically, the second processor 1103 in the network device 90 is further configured to run the computer program to execute the operations of the method in the technical solution shown in FIG. 4. Elaborations are omitted herein.

It is to be noted that the technical solutions recorded in the embodiments of the disclosure may be freely combined without conflicts.

The above is only the preferred embodiment of the disclosure and not intended to limit the scope of protection of the disclosure.

The invention claimed is:

1. A method for random access, applied to a User Equipment (UE), the method comprising:
   sending a preamble on a configured physical random access channel (PRACH) resource, and sending a UE Identifier (ID) on a configured uplink resource;
   receiving random access response (RAR) message based on first identification information, wherein the RAR message includes second identification information; and
   monitoring a physical downlink control channel (PDCCH) in a preset time window based on the second identification information or third identification information associated with the second identification information, wherein the PDCCH is scrambled through the second identification information or the third identification information;
   wherein the UE ID is a cell radio network temporary identifier (C-RNTI), and the first identification information comprises the C-RNTI;
   wherein the second identification information comprises any one of: a 5th generation (5G) system architecture evolution (SAE) temporary mobile subscriber identity (5G-S-TMSI); part of the 5G-S-TMSI; and a resume ID; and
   wherein the configured uplink resource has a mapping relationship with the configured PRACH resource.

2. The method of claim 1, wherein the configured uplink resource comprises a physical uplink control channel (PUCCH) resource and/or a physical uplink shared channel PUSCH) resource.

3. The method of claim 1, wherein receiving the RAR message based on the first identification information comprises:
   receiving the RAR message based on the C-RNTI.

4. The method of claim 3, further comprising:
   after the RAR message is received, stopping monitoring the PDCCH scrambled through the second identification information or the third identification information.

5. The method of claim 1, wherein a content in the second identification information is inconsistent with a content in the UE ID.

6. The method of claim 1, wherein the preset time window comprises an RAR window for monitoring the RAR message or a time window configured by a network device.

7. User Equipment (UE), comprising a first network interface and a first processor, wherein
   the first network interface is further configured to send a preamble on a configured physical random access channel (PRACH) resource and send a UE Identifier (ID) on a configured uplink resource;
   the first network interface is configured to receive a random access response (RAR) message based on first identification information, the RAR message including second identification information; and
   the first processor is further configured to detect a physical downlink control channel (PDCCH) in a preset time window based on the second identification information or third identification information associated with the second identification information, wherein the PDCCH is scrambled through the second identification information or the third identification information;

wherein the UE ID is a cell radio network temporary identifier (C-RNTI), and the first identification information comprises the C-RNTI;

wherein the second identification information comprises any one of: a 5th generation (5G) system architecture evolution (SAE) temporary mobile subscriber identity (5G-S-TMSI); part of the 5G-S-TMSI; and a resume ID; and wherein the configured uplink resource has a mapping relationship with the configured PRACH resource.

8. The UE of claim 7, wherein the configured uplink resource comprises a physical uplink control channel (PUCCH) resource and/or a physical uplink shared channel (PUSCH) resource.

9. The UE of claim 7, wherein the first network interface is configured to receive the RAR message based on the C-RNTI.

10. The UE of claim 9, wherein the first processor is further configured to, after the first network interface receives the RAR message, stop monitoring the PDCCH scrambled through the second identification information or the third identification information.

11. The UE of claim 7, wherein a content in the second identification information is inconsistent with a content in the UE ID.

12. The UE of claim 7, wherein the preset time window comprises an RAR window for monitoring the RAR message or a time window configured by a network device.

* * * * *